| United States Patent [19] | [11] | 4,346,068 |
|---|---|---|
| Kasai et al. | [45] | Aug. 24, 1982 |

[54] PROCESS FOR PREPARING HIGH-PURITY α-TYPE SILICON NITRIDE

[75] Inventors: Kiyoshi Kasai; Yoshitaka Kubota; Takaaki Tsukidate, all of Shin Nanyo, Japan

[73] Assignee: Toyo Soda Manufacturing Co., Ltd., Shin Nanyo, Japan

[21] Appl. No.: 222,671

[22] Filed: Jan. 5, 1981

[30] Foreign Application Priority Data

Jan. 11, 1980 [JP] Japan .................................. 55-1404

[51] Int. Cl.³ ........................................... C01B 21/068
[52] U.S. Cl. ..................................... 423/344; 423/406
[58] Field of Search ............... 423/344, 406; 106/73.4, 106/73.5; 501/154

[56] References Cited

U.S. PATENT DOCUMENTS 4,208,215  6/1980  Kleiner et al. .................. 423/344 X

FOREIGN PATENT DOCUMENTS 2814235  8/1978  Fed. Rep. of Germany ...... 423/344
54-124898  9/1979  Japan .................................. 423/344
54-126696  10/1979  Japan .................................. 423/344

OTHER PUBLICATIONS

Mitomo et al., "Yogyo-Kyokai-Shi"82, No. 942, 1974, pp. 144–145.

Primary Examiner—Jack Cooper
Attorney, Agent, or Firm—Cushman, Darby & Cushman

[57] ABSTRACT

High-purity α-type silicon nitride comprised of a granular crystal having an α-phase content of at least 95%, a nitrogen content of at least 38% by weight and an average particle size of not larger than 3 μm is provided. This high-purity α-type silicon nitride is prepared by heating a nitrogen-containing silane compound at a temperature of at least about 1,300° C. in a heating furnace comprised of a material containing a metal having a melting point exceeding 1,600° C. and capable of being bonded with oxygen at the heating temperature.

2 Claims, 3 Drawing Figures

PROCESS FOR PREPARING HIGH-PURITY α-TYPE SILICON NITRIDE

BACKGROUND OF THE INVENTION

1. Field of the Invention

This invention relates to high-purity α-type silicon nitride comprised of a fine granular crystal, and also to a process for the preparation thereof.

2. Description of the Prior Art

As is well-known, silicon nitride or sintered silicon nitride have advantageous properties over conventional ceramic products, such as (1) high mechanical strength and hardness and high strength at high temperatures, (2) high resistance to thermal shocks and high refractoriness, (3) relatively high thermal conductivity, (4) very small coefficient of thermal expansion, (5) good chemical stability and high corrosion resistance and (6) high electric insulation.

By virtue of these excellent properties, silicon nitride and sintered silicon nitride have heretofore been used as high-quality refractories, refractory materials, wear-resistant materials and electric insulators in the fields of the metal refining industry, the ceramic industry and the machine industry. Recently, silicon nitride and sintered silicon nitride have attracted attention as high-temperature materials for gas turbines, for which high strength, high resistance to thermal shocks and high resistance to mechanical shocks are required over a broad temperature range.

When sintered silicon nitride is put into practical use as a high-temperature high-stress material, high physical and chemical stability is strictly required for this material. Properties of this material, especially thermal and mechanical properties, are greatly influenced by the purity, crystal form, particle size and particle shape of silicon nitride used as the starting material to be sinterd and also by the kind of the starting material used for production of silicon nitride. When this material is used in the above-mentioned fields, for example, as a structural material for a gas turbine, it is required that silicon nitride should be in the form of a powder of high-purity α-type silicon nitride comprised of a fine granular crystal. However, powdery silicon nitride satisfying these requirements has not been developed, and it has been considered very difficult to produce such a powdery silicon nitride.

As the conventional method for preparing silicon nitride powder, there can be mentioned a so-called silica reducing method (1) in which a silica powder and a graphite powder are heated together in a nitrogen atmosphere, whereby the silica powder is reduced by the graphite powder to form an active silicon-containing vapor and, then, this vapor is reacted with nitrogen. This method, however, is defective in that both the silica powder and the graphite powder used as the starting materials must be highly refined, and the obtained product is a mixture of α-type silicon nitride, β-type silicon nitride, silicon oxide-nitride and silicon carbide, and contains a large amount of oxygen but has a low nitrogen content. In other words, it is difficult to obtain high-purity α-type silicon nitride powder. As another conventional method, there can be mentioned a direct nitriding method (2) in which a metallic silicon powder is first formed and it is directly nitrided in a nitrogen or ammonia stream under heating at a temperature lower than 1,500° C. while controlling the nitrogen gas pressure. Silicon nitride obtained according to this method contains a large amount of β-type silicon nitride, and is generally not in a fine powder form. Furthermore, it is necessary to pulverize the reaction product for a very long time. Accordingly, incorporation of impurities at the pulverizing step cannot be avoided, and the resulting silicon nitride powder is not suitable as the starting material for the manufacture of sintered silicon nitride having a high density and a high strength. As still another conventional method, there can be mentioned a method (3) in which silicon nitride is formed by a high-temperature vapor phase reaction between a silicon halide and ammonia. This method is advantageous in that α-type silicon nitride having a relatively high purity can be obtained, and this method is suitable for manufacture of a thin film of silicon nitride. However, this method is not suitable for manufacture of a starting powder for sintered silicon nitride. According to still another conventional method (4) comprising thermally decomposing silicon imide, α-type silicon nitride can easily be obtained, but this method is defective in that when an oxide or a non-oxide material forming a strong oxide film is used as the furnace-forming material, the obtained silicon nitride powder has a fibrous or needle-like form, and this powder is poor in shapeability at the step of forming a sintered product and uniform and homogeneous mixing of this powder with a sintereing aid is difficult.

SUMMARY OF THE INVENTION

It is, therefore, a primary object of the present invention to provide a process for preparing a silicon nitride, which obviates the foregoing defects of the known processes.

It is another primary object of the present invention to provide high-purity α-type silicon nitride comprised of a very fine granular crystal, which is very suitable as a starting material for the manufacture of sintered silicon nitride having a high strength.

The aforementioned objects are achieved by the present invention which provides a process for preparing silicon nitride by heating a nitrogen-containing silane compound at a high temperature, wherein the high-temperature heating is carried out in a heating furnace made of a material containing a metal having a melting point exceeding 1,600° C. and capable of being bonded with oxygen at the heating temperature to obtain high-purity α-type silicon nitride.

DESCRIPTION OF THE PREFERRED EMBODIMENTS

Figure 1:
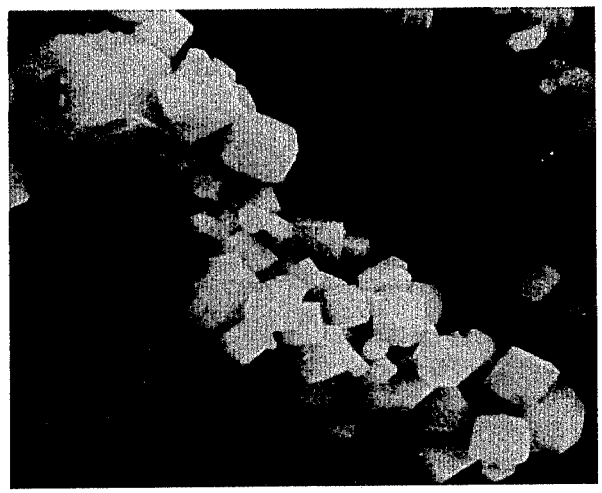
FIG. 1. is an electron microscope of a silicon nitride powder obtained in Example 1 according to the present invention.

Novel high-purity α-type silicon nitride comprised of a fine granular crystal, which is prepared according to the present invention, is a powder comprised of a granular crystal having an average particle size not larger than 3 μm, a nitrogen content of at least 38% by weight and an α-phase content of at least 95%. Both the nitrogen content and the α-phase content can be raised substantially to the theoretically maximum values, i.e., approximately 40% and approximately 100%, respectively. The average particle size can be reduced to approximately 0.1 μm. Accordingly, when a sintered product of silicon nitride is prepared by using this powder as the starting material, there can be obtained a sintered product of silicon nitride having a high density and a high strength, which has a very excellent strength at high temperatures, excellent resistance to thermal shocks and excellent chemical stability. The α-phase content, the nitrogen content and the average particle size can be determined by X-ray diffraction analysis, chemical analysis and electron microscopy, respectively.

The process for preparing such a silicon nitride powder according to the present invention will now be described.

The process according to the present invention is characterized by sintering a nitrogen-containing silane compound in a furnace made of a material containing a metal having a high melting point to form silicon nitride powder. As the nitrogen-containing silane compound used in the present invention, there can be mentioned, for example, tetraamidomonosilane [Si(HN$_2$)$_4$] and silicon imide [Si(NH)$_2$]. As the process for preparing the nitrogen-containing silane compound to be used as the starting substance for the manufacture of silicon nitride, there can be mentioned, for example, (1) a process in which gaseous silicon tetrachloride is reacted with solid ammonia at low temperatures, (2) a process in which solid silicon tetrachloride is reacted with gaseous ammonia at low temperatures, and (3) a process in which silicon tetrachloride is dissolved in n-hexane and the solution is reacted with gaseous ammonia at about 0° C. to obtain Si(NH)$_2$. All of the nitrogen-containing silane compounds prepared by these synthesis processes can be used as the starting substance in the present invention. In order to obtain α-type silicon nitride powder which is very fine and has a high purity, it is preferred that a nitrogen-containing silane compound prepared according to the following synthesis process be used as the starting substance. More specifically, according to this preferred process, gaseous silicon tetrachloride and ammonia gas are continuously introduced into a reaction vessel where they are reacted in a gaseous phase in an inert atmosphere at a temperature of −30° to 70° C., preferably 0° to 70° C., especially preferably 10° to 30° C. It is especially preferred that the nitrogen-containing silane compound prepared according to this synthesis process or a mixture of this nitrogen-containing silane compound and ammonium chloride formed as a by-product be used as the starting substance.

The process of the present invention is further characterized in that a special material is used as a furnace-forming material for the construction of a reaction furnace for thermal decomposition of the nitrogen-containing silane compound.

By the term "furnace-forming material" referred to in the present specification is meant a material used for the construction of members which are brought into contact with a thermal decomposition gas atmosphere at a high temperature at the step of thermal decomposition of the starting substance, such as a furnace tube, a crucible and a boat. In the present invention, it is indispensable that all or parts of these members and reaction furnace that are brought in contact with the above-mentioned atmosphere gas should be made of a material containing a high-melting-point metal such as described in detail hereinafter. The object of the present invention cannot be attained even if thermal decomposition is carried out in a furnace made of quartz glass, copper or iron.

As the high-melting-point metal material used as the furnace-forming material in the present invention, there can be mentioned metals having a melting point exceeding 1,600° C., and capable of being bonded with oxygen at a thermal decomposition temperature, such as molybdenum, zirconium, tantalum and alloys thereof. Among these metals, molybdenum is especially preferable.

In the present invention, the nitrogen-containing silane compound as the starting substance is charged in the above-mentioned furnace where it is heated in an ammonia gas atmosphere at a temperature of about 1,300° to about 1,600° C., preferably about 1,400° to about 1,550° C., to effect thermal decomposition. At a heating temperature lower than about 1,300° C., thermal decomposition of the nitrogen-containing silane compound is insufficient and amorphous silicon nitride is formed. If the heating temperature exceeds about 1,600° C., a silicon nitride powder having a high β-phase content is obtained. Accordingly, too high a temperature and too low a temperature are not preferred. This heating operation is conducted for a relatively short time, and the heating time may be varied within the range of from one minute to 10 hours, preferably from 10 minutes to 5 hours.

When the nitrogen-containing silane compound is thermally decomposed in a furnace made of a material containing molybdenum, zirconium or tantalum, especially molybdenum, a fine α-type silicon nitride of a granular crystal described hereinafter is formed. Although the reason has not been elucidated completely, it is believed that this effect will probably be attained because oxygen, which should inevitably be present in the reaction system, is controlled by the presence of the above-mentioned metal exhibiting an oxygen-bonding property at the step of thermal decomposition.

The presence of ammonia gas is indispensable at the step of thermal decomposition of the nitrogen-containing silane compound, but ageing of the thermal decomposition product, which is conducted according to need, may be carried out in an ammonia gas atmosphere and/or a nitrogen atmosphere.

When the above-mentioned nitrogen-containing silane compound as the starting substance is thermally decomposed under the above conditions in the above-mentioned heating furnace, a fine high-purity silicon nitride powder of a granular crystal having an average particle size of not larger than 3 μm, a nitrogen content of at least 38% by weight and an α-phase content of at least 95%, which is shown in the accompanying drawings, is obtained. When a sintered product of silicon nitride is formed by using this silicon nitride as the starting substance, the resulting sintered product is chemically and physically stable and has a higher strength than a sintered product of silicon nitride of a needle crystal obtained according to the conventional method. Therefore, the above-mentioned silicon nitride is valuable as the starting substance for manufacture of sintered silicon nitride useful for a high temperature gas turbine for which high strength and high reliability are required.

Silicon nitride of a needle crystal prepared according to the method illustrated in Comparative Examples given hereinafter is defective in that homogeneous mixing of this silicon nitride with a sintering aid at the sintering and shaping step cannot be attained and, therefore, it is difficult to obtain a sintered product having a high density.

The present invention will now be described in detail with reference to the following Examples.

EXAMPLE 1 AND COMPARATIVE EXAMPLES 1 AND 2

Figure 2:
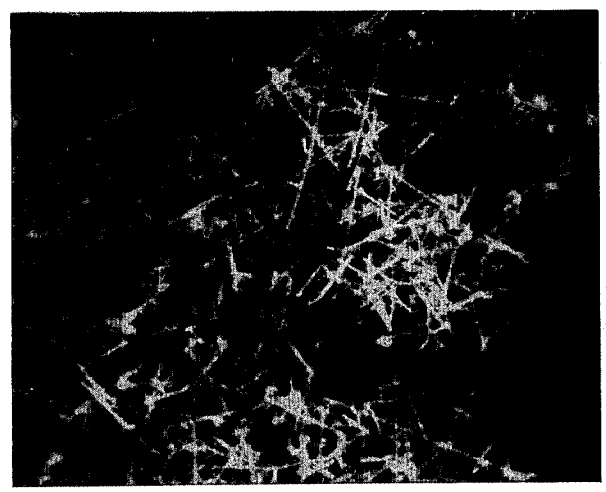
FIG. 2 is an electron microscope photograph of a powder obtained in the Comparative Example.
Figure 3:
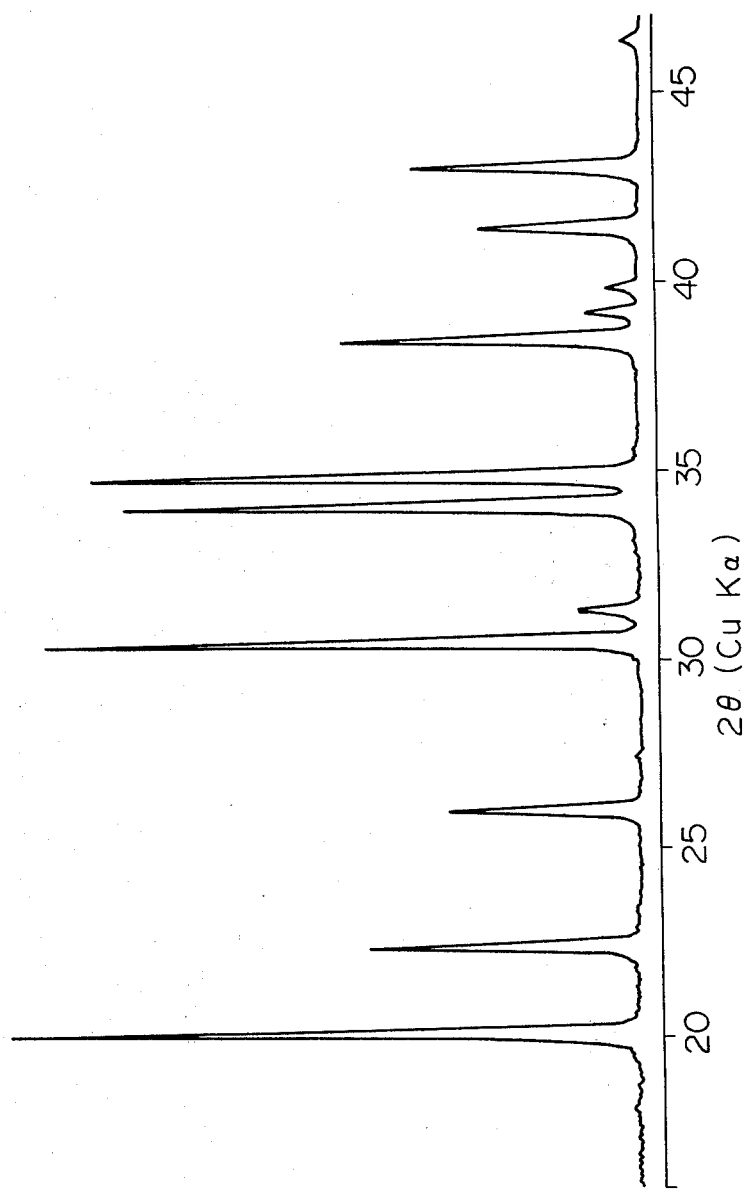
FIG. 3 is an X-ray diffraction chart of a silicon nitride powder obtained in Example 1 according to the present invention.

A saturated vapor (25° C.) of silicon tetrachloride carried by nitrogen gas as a carrier gas was introduced at a rate of 33 g/hr into an outer tube of a feeding double tube and ammonia gas was introduced at a rate of 20 g/hr into an inner tube of the feeding double tube, and they were guided into a reaction tube having a diameter of 60 mm and a length of 280 mm, maintained at 10° C. by water cooling, whereby both gases were reacted continuously with each other. The resulting fine powder was delivered by the nitrogen gas and collected in a vessel disposed in the bottom portion of the reaction tube. Then, 20 g of the so formed product was charged in a tubular furnace vessel made of a material shown in Table 1, below, and having a diameter of 50 mm, and in an ammonia atmosphere, the temperature was elevated at a rate of 200° C./hr and the product was maintained at 1,500° C. for 1 hour. The three materials shown in Table 1 were separately used as the furnace material, and three kinds of powders were obtained. The nitrogen content, α-phase content, average particle size and powder shape of each product were examined to obtain the results shown in Table 1. An electron microscope photograph (3000 magnification) of the product obtained in Example 1 and an X-ray diffraction chart thereof are shown in FIG. 1, and FIG. 3, respectively, and an electron microscope photograph of the product obtained in Comparative Example 2 is shown in FIG. 2.

TABLE 1

|  | Comparative Example 1 | Comparative Example 2 | Example 1 |
|---|---|---|---|
| Furnace-forming material | Mullite | Alumina | Molybdenum |
| Nitrogen content (%) | 37.2 | 37.8 | 38.5 |
| α-phase content (%) | 94 | 95 | 99 |

TABLE 1-continued

|  | Comparative Example 1 | Comparative Example 2 | Example 1 |
|---|---|---|---|
| Average particle size (μ) | 1.5 | 1.3 | 2.5 |
| Crystal form of powder | Needle | Needle | Granule |

EXAMPLE 2 AND COMPARATIVE EXAMPLES 3 AND 4

A powdery mixture of $Si(NH)_2$ and $NH_4Cl$, prepared in the same manner as described in Example 1, was washed with liquid ammonia at $-70°$ C. to remove $NH_4Cl$ formed as a by-product and isolate $Si(NH)_2$. The so recovered $Si(NH)_2$ was treated in three separate furnaces made of materials shown in Table 2, according to the procedures described in Example 1, to obtain three kinds of powders. The nitrogen content, α-phase content, average particle size and powder shape of each product were examined to obtain the results shown in Table 2.

TABLE 2

|  | Comparative Example 3 | Comparative Example 4 | Example 2 |
|---|---|---|---|
| Furnace-forming material | Magnesia | Silicon carbide | Molybdenum |
| Nitrogen content (%) | 37.2 | 38.0 | 38.5 |
| α-phase content (%) | 94 | 95 | 99 |
| Average particle size (μ) | 1.5 | 1.3 | 2.5 |
| Crystal form of powder | Needle | Fiber | Granule |

We claim:

1. A process for preparing silicon nitride which comprises heating a nitrogen-containing silane compound at a temperature in the range of about 1,300° C. to about 1,600° C. in an ammonia gas atmosphere in a heating furnace made of a metal selected from the group consisting of molybdenum, zirconium, tantalum and alloys thereof to obtain a high-purity α-type silicon nitride, said nitrogen-containing silane compound obtained by reacting silicon tetrachloride with ammonia in the gaseous phase in an inert atmosphere at a temperature of from $-30°$ C. to 70° C.

2. A process according to claim 1, wherein the heating furnace is made of molybdenum or its alloy.

* * * * *